US010467610B2

(12) United States Patent
Dunn et al.

(10) Patent No.: US 10,467,610 B2
(45) Date of Patent: *Nov. 5, 2019

(54) SYSTEM AND METHOD FOR A REDUNDANT MULTI-PANEL ELECTRONIC DISPLAY

(71) Applicant: Manufacturing Resources International, Inc., Alpharetta, GA (US)

(72) Inventors: William Dunn, Alpharetta, GA (US); David Williams, Canton, GA (US); Doug Bennett, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/239,849

(22) Filed: Jan. 4, 2019

(65) Prior Publication Data

US 2019/0139015 A1 May 9, 2019

Related U.S. Application Data

(63) Continuation of application No. 15/159,106, filed on May 19, 2016, now Pat. No. 10,269,156.
(Continued)

(51) Int. Cl.
*G09G 5/00* (2006.01)
*G06Q 20/20* (2012.01)
(Continued)

(52) U.S. Cl.
CPC .............. *G06Q 20/20* (2013.01); *G06T 11/60* (2013.01); *G07G 1/01* (2013.01); *G09G 5/14* (2013.01);
(Continued)

(58) Field of Classification Search
CPC ................. G09G 5/14; G09G 2340/10; G09G 2340/125; G06T 11/60; G06T 15/503
(Continued)

(56) References Cited

U.S. PATENT DOCUMENTS 4,271,410 A 6/1981 Crawford
4,399,456 A 8/1983 Zalm
(Continued)

FOREIGN PATENT DOCUMENTS

CN 1613264 A 5/2005
CN 101777315 A 7/2010
(Continued)

OTHER PUBLICATIONS

AMS AG, TCS3404, TCS3414, Digital Color Sensors, Apr. 2011, 41 pages, Texas Advanced Optoelectronic Solutions Inc. is now ams AG.
(Continued)

*Primary Examiner* — Gordon G Liu
(74) *Attorney, Agent, or Firm* — Standley Law Group LLP; Jeffrey S. Standley; Adam J. Smith

(57) ABSTRACT

A system and method for redundant multi-panel display is provided. A first system control board is electrically connected to the first electronic display and a first video player. A second system control board is electrically connected to the second electronic display, the first video player, and a second video player. The second system control board is configured to begin utilizing the first video player upon failure of the second video player. Order information is received from a point of sale data output and transmitted to at least one of the first system control board and the second system control board. The first and second video players are
(Continued)

configured to cause background images to blended with the order information and displayed on the respective electronic display.

20 Claims, 4 Drawing Sheets

Related U.S. Application Data

(60) Provisional application No. 62/183,808, filed on Jun. 24, 2015, provisional application No. 62/171,323, filed on Jun. 5, 2015.

(51) Int. Cl.
*G09G 5/14* (2006.01)
*G07G 1/01* (2006.01)
*G06T 11/60* (2006.01)
*G06F 3/14* (2006.01)
*G06Q 30/02* (2012.01)

(52) U.S. Cl.
CPC ....... *G06F 3/1431* (2013.01); *G06Q 30/0241* (2013.01); *G09G 2340/10* (2013.01); *G09G 2340/12* (2013.01)

(58) Field of Classification Search
USPC ........................................................ 345/629
See application file for complete search history.

(56) References Cited

U.S. PATENT DOCUMENTS

| | | | |
|---|---|---|---|
| 4,456,910 A | 6/1984 | DiMassimo et al. | |
| 4,571,616 A | 2/1986 | Haisma et al. | |
| 4,593,978 A | 6/1986 | Mourey et al. | |
| 4,753,519 A | 6/1988 | Miyatake | |
| 5,029,982 A | 7/1991 | Nash | |
| 5,049,987 A | 9/1991 | Hoppenstein | |
| 5,081,523 A | 1/1992 | Frazier | |
| 5,088,806 A | 2/1992 | McCartney et al. | |
| 5,093,654 A | 3/1992 | Swift et al. | |
| 5,115,229 A | 5/1992 | Shalit | |
| 5,162,645 A | 11/1992 | Wagensonner et al. | |
| 5,162,785 A | 11/1992 | Fagard | |
| 5,351,201 A | 9/1994 | Harshbarger, Jr. et al. | |
| 5,402,141 A | 3/1995 | Haim et al. | |
| 5,565,894 A | 10/1996 | Bates et al. | |
| 5,656,824 A | 8/1997 | den Boer et al. | |
| 5,663,952 A | 9/1997 | Gentry, Jr. | |
| 5,694,141 A | 12/1997 | Chee | |
| 5,751,346 A | 5/1998 | Dozier et al. | |
| 5,835,074 A | 11/1998 | Didier et al. | |
| 5,872,593 A | 2/1999 | Kawashima | |
| 5,886,731 A | 3/1999 | Ebisawa | |
| 5,912,743 A * | 6/1999 | Kinebuchi | G06Q 10/087 358/442 |
| 6,027,222 A | 2/2000 | Oki et al. | |
| 6,032,126 A | 2/2000 | Kaehler | |
| 6,055,012 A | 4/2000 | Haskell et al. | |
| 6,075,556 A | 6/2000 | Urano et al. | |
| 6,091,777 A | 7/2000 | Guetz et al. | |
| 6,094,457 A | 7/2000 | Linzer et al. | |
| 6,100,906 A | 8/2000 | Asaro et al. | |
| 6,153,985 A | 11/2000 | Grossman | |
| 6,192,083 B1 | 2/2001 | Linzer et al. | |
| 6,259,492 B1 | 7/2001 | Imoto et al. | |
| 6,292,157 B1 | 9/2001 | Greene et al. | |
| 6,292,228 B1 | 9/2001 | Cho | |
| 6,297,859 B1 | 10/2001 | George | |
| 6,326,934 B1 | 12/2001 | Kinzie | |
| 6,359,390 B1 | 3/2002 | Nagai | |
| 6,392,727 B1 | 5/2002 | Larson et al. | |
| 6,417,900 B1 | 7/2002 | Shin et al. | |
| 6,421,103 B2 | 7/2002 | Yamaguchi | |
| 6,421,694 B1 | 7/2002 | Nawaz et al. | |
| 6,428,198 B1 | 8/2002 | Saccomanno et al. | |
| 6,536,041 B1 | 3/2003 | Knudson et al. | |
| 6,546,294 B1 | 4/2003 | Kelsey et al. | |
| 6,553,336 B1 | 4/2003 | Johnson et al. | |
| 6,587,525 B2 | 7/2003 | Jeong et al. | |
| 6,642,666 B1 | 11/2003 | St-Germain | |
| 6,674,463 B1 | 1/2004 | Just et al. | |
| 6,690,726 B1 | 2/2004 | Yavits et al. | |
| 6,697,100 B2 | 2/2004 | Tatsuzawa | |
| 6,698,020 B1 | 2/2004 | Zigmond et al. | |
| 6,701,143 B1 | 3/2004 | Dukach et al. | |
| 6,712,046 B2 | 3/2004 | Nakamichi | |
| 6,812,851 B1 | 11/2004 | Dukach et al. | |
| 6,820,050 B2 | 11/2004 | Simmon et al. | |
| 6,825,899 B2 | 11/2004 | Kobayashi | |
| 6,850,209 B2 | 2/2005 | Mankins et al. | |
| 6,996,460 B1 | 2/2006 | Krahnstoever et al. | |
| 7,038,186 B2 | 5/2006 | De Brabander et al. | |
| 7,057,590 B2 | 6/2006 | Lim et al. | |
| 7,103,852 B2 | 9/2006 | Kairis, Jr. | |
| 7,136,415 B2 | 11/2006 | Yun et al. | |
| 7,174,029 B2 | 2/2007 | Agostinelli et al. | |
| 7,304,638 B2 | 12/2007 | Murphy | |
| 7,307,614 B2 | 12/2007 | Vinn | |
| 7,319,862 B1 | 1/2008 | Lincoln et al. | |
| 7,358,851 B2 | 4/2008 | Patenaude et al. | |
| 7,385,593 B2 | 6/2008 | Krajewski et al. | |
| 7,391,811 B2 | 6/2008 | Itoi et al. | |
| 7,480,042 B1 | 1/2009 | Phillips et al. | |
| 7,518,600 B2 | 4/2009 | Lee | |
| 7,573,458 B2 | 8/2009 | Dunn | |
| 7,581,094 B1 | 8/2009 | Apostolopoulos et al. | |
| 7,614,065 B2 | 11/2009 | Weissmueller et al. | |
| 7,636,927 B2 | 12/2009 | Zigmond et al. | |
| 7,669,757 B1 | 3/2010 | Crews et al. | |
| 7,714,834 B2 | 5/2010 | Dunn | |
| 7,764,280 B2 | 7/2010 | Shiina | |
| 7,810,114 B2 | 7/2010 | Flickinger et al. | |
| 7,813,694 B2 | 10/2010 | Fishman et al. | |
| 7,825,991 B2 | 11/2010 | Enomoto | |
| 7,924,263 B2 | 4/2011 | Dunn | |
| 7,937,724 B2 | 5/2011 | Clark et al. | |
| 7,988,849 B2 | 8/2011 | Biewer et al. | |
| 8,130,836 B2 | 3/2012 | Ha | |
| 8,212,921 B2 | 7/2012 | Yun | |
| 8,218,812 B2 | 7/2012 | Sugimoto et al. | |
| 8,242,974 B2 | 8/2012 | Yamazaki et al. | |
| 8,350,799 B2 | 1/2013 | Wasinger et al. | |
| 8,400,570 B2 | 3/2013 | Dunn et al. | |
| 8,417,376 B1 | 4/2013 | Smolen | |
| 8,441,574 B2 | 5/2013 | Dunn et al. | |
| 8,605,121 B2 | 12/2013 | Chu et al. | |
| 8,689,343 B2 | 4/2014 | De Laet | |
| 8,704,752 B2 | 4/2014 | Wasinger et al. | |
| 8,823,630 B2 | 9/2014 | Roberts et al. | |
| 9,026,686 B2 | 5/2015 | Dunn et al. | |
| 9,031,872 B1 | 5/2015 | Foster | |
| 9,582,157 B1 | 2/2017 | Chatterjee et al. | |
| 2001/0019454 A1 | 9/2001 | Tadic-Galeb et al. | |
| 2002/0009978 A1 | 1/2002 | Dukach et al. | |
| 2002/0018522 A1 | 2/2002 | Wiedenmann | |
| 2002/0026354 A1 | 2/2002 | Shoji et al. | |
| 2002/0065046 A1 | 5/2002 | Mankins et al. | |
| 2002/0084891 A1 | 7/2002 | Mankins et al. | |
| 2002/0112026 A1 | 8/2002 | Fridman et al. | |
| 2002/0118320 A1 | 8/2002 | Bayrle et al. | |
| 2002/0120721 A1 | 8/2002 | Eilers et al. | |
| 2002/0147648 A1 | 10/2002 | Fadden et al. | |
| 2002/0154138 A1 | 10/2002 | Wada et al. | |
| 2002/0163513 A1 | 11/2002 | Tsuji | |
| 2002/0164962 A1 | 11/2002 | Mankins et al. | |
| 2002/0190972 A1 | 12/2002 | Ven de Van | |
| 2002/0194365 A1 | 12/2002 | Jammes | |
| 2002/0194609 A1 | 12/2002 | Tran | |
| 2003/0030733 A1 | 2/2003 | Seaman et al. | |
| 2003/0031128 A1 | 2/2003 | Kim et al. | |
| 2003/0039312 A1 | 2/2003 | Horowitz et al. | |

(56) References Cited

U.S. PATENT DOCUMENTS

| | | |
|---|---|---|
| 2003/0061316 A1 | 3/2003 | Blair et al. |
| 2003/0098881 A1 | 5/2003 | Nolte et al. |
| 2003/0117428 A1 | 6/2003 | Li et al. |
| 2003/0125892 A1 | 7/2003 | Edge |
| 2003/0161354 A1 | 8/2003 | Bader et al. |
| 2003/0177269 A1 | 9/2003 | Robinson et al. |
| 2003/0196208 A1 | 10/2003 | Jacobson |
| 2003/0202605 A1 | 10/2003 | Hazra et al. |
| 2003/0227428 A1 | 12/2003 | Nose |
| 2004/0012722 A1 | 1/2004 | Alvarez |
| 2004/0036622 A1 | 2/2004 | Dukach et al. |
| 2004/0114041 A1 | 6/2004 | Doyle et al. |
| 2004/0136698 A1* | 7/2004 | Mock ................ G11B 27/105 386/232 |
| 2004/0138840 A1 | 7/2004 | Wolfe |
| 2004/0194131 A1 | 9/2004 | Ellis et al. |
| 2004/0207738 A1 | 10/2004 | Wacker |
| 2004/0252187 A1 | 12/2004 | Alden |
| 2005/0005302 A1 | 1/2005 | Zigmond et al. |
| 2005/0012734 A1 | 1/2005 | Johnson et al. |
| 2005/0046951 A1 | 3/2005 | Sugihara et al. |
| 2005/0071252 A1 | 3/2005 | Henning et al. |
| 2005/0123001 A1 | 6/2005 | Craven et al. |
| 2005/0127796 A1 | 6/2005 | Olesen et al. |
| 2005/0134525 A1 | 6/2005 | Tanghe et al. |
| 2005/0134526 A1 | 6/2005 | Willem et al. |
| 2005/0184983 A1 | 8/2005 | Brabander et al. |
| 2005/0188402 A1 | 8/2005 | de Andrade et al. |
| 2005/0195330 A1 | 9/2005 | Zacks et al. |
| 2005/0216939 A1 | 9/2005 | Corbin |
| 2005/0253699 A1 | 11/2005 | Madonia |
| 2005/0289061 A1 | 12/2005 | Kulakowski et al. |
| 2005/0289588 A1 | 12/2005 | Kinnear |
| 2006/0087521 A1 | 4/2006 | Chu et al. |
| 2006/0150222 A1 | 7/2006 | McCafferty et al. |
| 2006/0160614 A1 | 7/2006 | Walker et al. |
| 2006/0214904 A1 | 9/2006 | Kimura et al. |
| 2006/0215044 A1 | 9/2006 | Masuda et al. |
| 2006/0244702 A1 | 11/2006 | Yamazaki et al. |
| 2007/0047808 A1 | 3/2007 | Choe et al. |
| 2007/0094620 A1 | 4/2007 | Park |
| 2007/0120763 A1 | 5/2007 | De Paepe et al. |
| 2007/0127569 A1 | 6/2007 | Hatalker |
| 2007/0152949 A1 | 7/2007 | Sakai |
| 2007/0157260 A1 | 7/2007 | Walker |
| 2007/0164932 A1 | 7/2007 | Moon |
| 2007/0165955 A1 | 7/2007 | Hwang et al. |
| 2007/0168539 A1 | 7/2007 | Day |
| 2007/0200513 A1 | 8/2007 | Ha et al. |
| 2007/0211179 A1 | 9/2007 | Hector et al. |
| 2007/0247594 A1 | 10/2007 | Tanaka |
| 2007/0274400 A1 | 11/2007 | Murai et al. |
| 2007/0286107 A1 | 12/2007 | Singh et al. |
| 2007/0297172 A1 | 12/2007 | Furukawa et al. |
| 2008/0008471 A1 | 1/2008 | Dress |
| 2008/0017422 A1 | 1/2008 | Carro |
| 2008/0018584 A1 | 1/2008 | Park et al. |
| 2008/0028059 A1 | 1/2008 | Shin et al. |
| 2008/0037783 A1 | 2/2008 | Kim et al. |
| 2008/0055247 A1 | 3/2008 | Boillot |
| 2008/0074372 A1 | 3/2008 | Baba et al. |
| 2008/0093443 A1 | 4/2008 | Barcelou |
| 2008/0104631 A1 | 5/2008 | Krock et al. |
| 2008/0106527 A1 | 5/2008 | Cornish et al. |
| 2008/0112601 A1 | 5/2008 | Warp |
| 2008/0119237 A1 | 5/2008 | Kim |
| 2008/0143637 A1 | 6/2008 | Sunahara et al. |
| 2008/0163291 A1 | 7/2008 | Fishman et al. |
| 2008/0170028 A1 | 7/2008 | Yoshida |
| 2008/0174522 A1 | 7/2008 | Cho et al. |
| 2008/0201208 A1 | 8/2008 | Tie et al. |
| 2008/0231604 A1 | 9/2008 | Peterson |
| 2008/0232478 A1 | 9/2008 | Teng et al. |
| 2008/0246871 A1 | 10/2008 | Kupper et al. |
| 2008/0266331 A1 | 10/2008 | Chen et al. |
| 2008/0272999 A1 | 11/2008 | Kurokawa et al. |
| 2008/0278432 A1 | 11/2008 | Ohshima |
| 2008/0278455 A1 | 11/2008 | Atkins et al. |
| 2008/0303918 A1 | 12/2008 | Keithley |
| 2008/0313046 A1 | 12/2008 | Denenburg et al. |
| 2009/0003244 A1 | 1/2009 | Matsuo |
| 2009/0036190 A1 | 2/2009 | Brosnan et al. |
| 2009/0058845 A1 | 3/2009 | Fukuda et al. |
| 2009/0102914 A1 | 4/2009 | Collar et al. |
| 2009/0102973 A1 | 4/2009 | Harris |
| 2009/0109165 A1 | 4/2009 | Park et al. |
| 2009/0128867 A1 | 5/2009 | Edge |
| 2009/0164615 A1 | 6/2009 | Akkanen |
| 2009/0182917 A1 | 7/2009 | Kim |
| 2009/0219295 A1 | 9/2009 | Reijnaerts |
| 2009/0251602 A1 | 10/2009 | Williams et al. |
| 2009/0254439 A1 | 10/2009 | Dunn |
| 2009/0256965 A1 | 10/2009 | Moote et al. |
| 2009/0260028 A1 | 10/2009 | Dunn et al. |
| 2009/0267866 A1 | 10/2009 | Reddy et al. |
| 2009/0273568 A1 | 11/2009 | Milner |
| 2009/0284457 A1 | 11/2009 | Botzas et al. |
| 2009/0289968 A1 | 11/2009 | Yoshida |
| 2009/0313125 A1 | 12/2009 | Roh et al. |
| 2009/0315867 A1 | 12/2009 | Sakamoto et al. |
| 2010/0039440 A1 | 2/2010 | Tanaka et al. |
| 2010/0039696 A1 | 2/2010 | de Groot et al. |
| 2010/0042506 A1* | 2/2010 | Ravenel ............... G06Q 20/123 705/21 |
| 2010/0060550 A1 | 3/2010 | McGinn et al. |
| 2010/0066762 A1 | 3/2010 | Yeh et al. |
| 2010/0083305 A1 | 4/2010 | Acharya et al. |
| 2010/0104003 A1 | 4/2010 | Dunn et al. |
| 2010/0109974 A1 | 5/2010 | Dunn et al. |
| 2010/0177157 A1 | 7/2010 | Berlage |
| 2010/0177158 A1 | 7/2010 | Walter |
| 2010/0188342 A1 | 7/2010 | Dunn |
| 2010/0194861 A1 | 8/2010 | Hoppenstein |
| 2010/0195865 A1 | 8/2010 | Luff |
| 2010/0198983 A1 | 8/2010 | Monroe et al. |
| 2010/0217613 A1 | 8/2010 | Kelly |
| 2010/0231563 A1 | 9/2010 | Dunn et al. |
| 2010/0238299 A1 | 9/2010 | Dunn et al. |
| 2010/0242081 A1 | 9/2010 | Dunn et al. |
| 2010/0253613 A1 | 10/2010 | Dunn et al. |
| 2010/0253778 A1 | 10/2010 | Lee et al. |
| 2011/0012856 A1 | 1/2011 | Maxwell et al. |
| 2011/0047567 A1 | 2/2011 | Zigmond et al. |
| 2011/0069018 A1 | 3/2011 | Atkins et al. |
| 2011/0074803 A1 | 3/2011 | Kerofsky |
| 2011/0078536 A1 | 3/2011 | Han et al. |
| 2011/0102630 A1 | 5/2011 | Rukes |
| 2011/0181693 A1 | 7/2011 | Lee et al. |
| 2011/0225859 A1 | 9/2011 | Safavi |
| 2011/0273482 A1 | 11/2011 | Massart et al. |
| 2012/0075362 A1 | 3/2012 | Ichioka et al. |
| 2012/0182278 A1 | 7/2012 | Ballestad |
| 2012/0188262 A1 | 7/2012 | Rabii |
| 2012/0203872 A1 | 8/2012 | Luby et al. |
| 2012/0268350 A1 | 10/2012 | Yoshimura |
| 2012/0302343 A1 | 11/2012 | Hurst et al. |
| 2013/0103504 A1 | 4/2013 | Srinivasan et al. |
| 2013/0110565 A1 | 5/2013 | Means, Jr. et al. |
| 2013/0162908 A1 | 6/2013 | Son et al. |
| 2013/0173358 A1 | 7/2013 | Pinkus |
| 2013/0347019 A1 | 12/2013 | Herlein et al. |
| 2014/0043302 A1 | 2/2014 | Barnes |
| 2014/0101535 A1 | 4/2014 | Kim et al. |
| 2014/0114778 A1 | 4/2014 | Miller et al. |
| 2014/0132796 A1 | 5/2014 | Prentice et al. |
| 2014/0136935 A1 | 5/2014 | Santillie et al. |
| 2014/0139116 A1 | 5/2014 | Reed |
| 2014/0184547 A1 | 7/2014 | Tokunaga |
| 2014/0240201 A1 | 8/2014 | Takahashi et al. |
| 2014/0246982 A1 | 9/2014 | Araki et al. |
| 2014/0333541 A1 | 11/2014 | Lee et al. |
| 2014/0361969 A1 | 12/2014 | Wasinger et al. |
| 2014/0375704 A1 | 12/2014 | Bi et al. |
| 2015/0070340 A1 | 3/2015 | Trachtenberg et al. |

(56) References Cited

U.S. PATENT DOCUMENTS

| | | |
|---|---|---|
| 2015/0227978 A1 | 8/2015 | Woycik et al. |
| 2015/0253937 A1 | 9/2015 | Kim et al. |
| 2015/0312488 A1 | 10/2015 | Kostrzewa et al. |
| 2015/0382072 A1 | 12/2015 | Lee et al. |
| 2016/0014103 A1 | 1/2016 | Masters et al. |
| 2016/0034240 A1 | 2/2016 | Kreiner et al. |
| 2016/0055823 A1 | 2/2016 | Feng et al. |
| 2016/0063954 A1 | 3/2016 | Ryu |
| 2016/0125777 A1 | 5/2016 | Knepper et al. |
| 2016/0293206 A1 | 10/2016 | Dunn |
| 2016/0335705 A1 | 11/2016 | Williams et al. |
| 2016/0358357 A1 | 12/2016 | Dunn et al. |
| 2017/0111486 A1 | 4/2017 | Bowers et al. |
| 2017/0256212 A1 | 9/2017 | Dunn et al. |
| 2017/0278440 A1 | 9/2017 | Dunn et al. |
| 2017/0346584 A1 | 11/2017 | De Laet et al. |
| 2018/0047345 A1 | 2/2018 | Dunn et al. |

FOREIGN PATENT DOCUMENTS

| | | | |
|---|---|---|---|
| CN | 102246196 A | | 11/2011 |
| EP | 0313331 A2 | | 4/1989 |
| EP | 1640337 A2 | | 3/2006 |
| EP | 2332120 A2 | | 6/2011 |
| EP | 2401736 A2 | | 1/2012 |
| EP | 2401869 A2 | | 1/2012 |
| ID | 0514488 A | | 9/2011 |
| JP | 2002064842 A | | 2/2002 |
| JP | 2002209230 A | | 7/2002 |
| JP | 2002366121 A | | 12/2002 |
| JP | 2005236469 A | | 9/2005 |
| JP | 2006184859 A | | 7/2006 |
| JP | 2008034841 A | | 2/2008 |
| JP | 2008165055 A | | 7/2008 |
| JP | 2009009422 A | | 1/2009 |
| KR | 20000021499 A | | 4/2000 |
| KR | 20020072633 A | | 9/2002 |
| TW | 200403940 A | | 3/2004 |
| TW | 201729056 A | | 8/2017 |
| WO | WO9608892 A1 | | 3/1996 |
| WO | WO2006089556 A1 | | 8/2006 |
| WO | WO2006111689 A1 | | 10/2006 |
| WO | WO2009004574 A1 | | 1/2009 |
| WO | WO2010037104 A2 | | 4/2010 |
| WO | WO2010085783 A1 | | 7/2010 |
| WO | WO2010085784 A2 | | 7/2010 |
| WO | WO2010094039 A2 | | 8/2010 |
| WO | WO2010099178 A2 | | 9/2010 |
| WO | WO2010099194 A2 | | 9/2010 |
| WO | WO2011026186 A1 | | 3/2011 |
| WO | WO2011035370 A1 | | 3/2011 |
| WO | WO2011044640 A1 | | 4/2011 |
| WO | WO2011060487 A1 | | 5/2011 |
| WO | WO2011143720 A1 | | 11/2011 |
| WO | WO2016000546 A1 | | 1/2016 |
| WO | WO2017165543 A1 | | 9/2017 |
| WO | WO2017210317 A1 | | 12/2017 |
| WO | WO2018031717 A2 | | 2/2018 |

OTHER PUBLICATIONS

Analog Devices, ADV212: JPEG 2000 Video Codec, http://www.analog.com/en/audiovideo-products/video-compression/ADV212/products/pr . . . , accessed Oct. 15, 2008, 2 pages.

Analog Devices, Inc., JPEG 2000 Video Codec ADV212, 2006, 44 pages.

Photo Research, Inc., PR-650 SpectraScan Colorimeter, 1999, 2 pages.

Teravision Corp, LCD-TV Panel Control Board Specification, Nov. 2007, 24 pages.

Texas Advanced Optoelectronic Solutions Inc., TCS230 Programmable Color Light-To-Frequency Converter, Dec. 2007, 12 pages.

Texas Advanced Optoelectronic Solutions Inc., TCS3404CS, TCS3414CS Digital Color Light Sensors, Feb. 2009, 38 pages.

Wikipedia, Color rendering index, https://en.wikipedia.org/wiki/Color_rendering_index, accessed Aug. 25, 2016, 13 pages.

Wikipedia, Gamut, https://en.wikipedia.org/wiki/Gamut, accessed Aug. 25, 2016, 8 pages.

Wikipedia, Gradient-index optics, https://en.wikipedia.org/wiki/Gradient-index_optics, accessed Aug. 25, 2016, 5 pages.

Wikipedia, Alpha compositing, https://web.archive.org/web/20080801130026/https://en.wikipedia.org/wiki/Alpha_compositing, from Wikipedia on Aug. 1, 2008, retrieved on Jun. 6, 2018, 4 pages.

\* cited by examiner

SYSTEM AND METHOD FOR A REDUNDANT MULTI-PANEL ELECTRONIC DISPLAY

CROSS-REFERENCE TO RELATED APPLICATIONS

This application is a continuation of U.S. application Ser. No. 15/159,106 filed May 19, 2016, which claims the benefit of U.S. Provisional Patent Ser. No. 62/171,323 filed Jun. 5, 2015 and U.S. Provisional Patent Ser. No. 62/183,808 filed Jun. 24, 2015, the disclosures of all of which are hereby incorporated by reference in their entireties.

TECHNICAL FIELD

Embodiments generally relate to electronic displays used for advertising and point of sale applications.

BACKGROUND OF THE ART

Large electronic display assemblies have traditionally used an array of multiple separate electronic displays, each having their own video driver, timing and control board, as well as other electronics necessary to operate each display. A border or bezel is generally placed between each separate display in order to secure each display into the overall assembly. In some cases, a single monolithic display is used to provide a number of separately-controlled areas which can contain a mixture of advertising images/video as well as menu information.

SUMMARY OF THE EXEMPLARY EMBODIMENTS

The exemplary embodiments herein provide a system and method for blending order confirmation data with background image data in order to provide order confirmation to a customer without having to use display space for order confirmation on its own. A number of image blending techniques can be used with the embodiments herein.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1A:
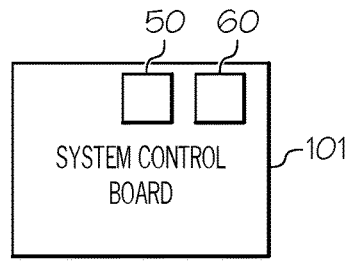
FIG. 1A is a simplified bock diagram of one embodiment of the system control board.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Initially it should be noted that one of ordinary skill in the art understands that electronic displays as described herein are capable of displaying both still images as well as videos. Thus, for brevity in this application the term 'image' will be used to represent both still images as well as full motion video.

FIG. 1A is a simplified bock diagram of one embodiment of the system control board 101. In an exemplary embodiment, the system control board 101 can contain several electronic components, including but not limited to: electronic storage device 50 and a processor 60.

Figure 1B:
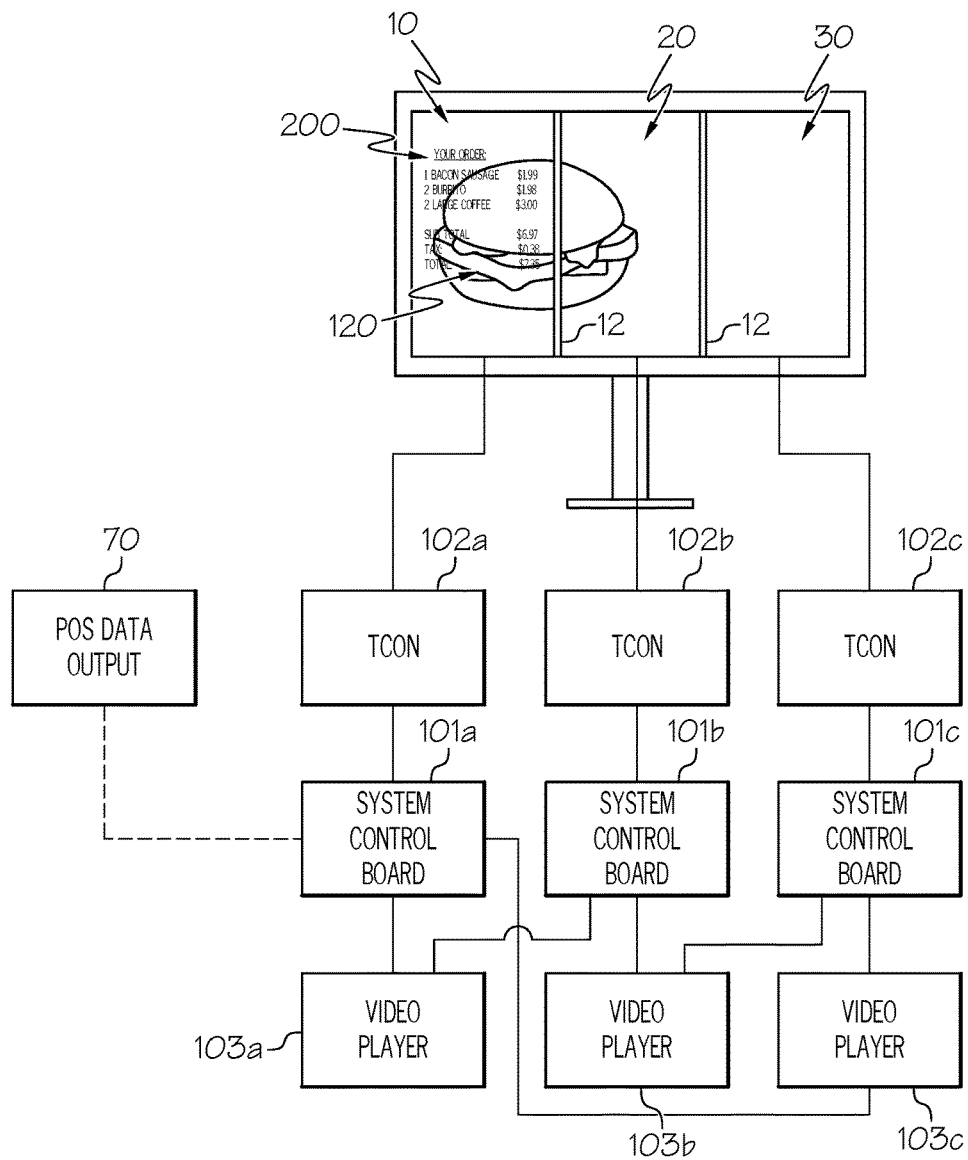
FIG. 1B is a simplified bock diagram of one embodiment of the image blending system.

FIG. 1B is a simplified bock diagram of one embodiment of the image blending system. In this embodiment, three separate displays 10, 20, and 30 are placed in a 1×3 array and contained within a housing that places a portion of the bezel 12 in between each display. Display 10 is in electronic communication with a timing and control (TCON) board 102a, system control board 101a, and a video player 103a. Similarly, display 20 is in electronic communication with a timing and control (TCON) board 102b, system control board 101b, and a video player 103b. Finally, display 30 is in electronic communication with a timing and control (TCON) board 102c, system control board 101c, and a video player 103c.

In the specific embodiment shown in FIG. 1B, each video player 103a-103c contains two video outputs and is capable of driving two displays simultaneously. In this way, video player 103a is in electrical communication with system control boards 101a and 101b. Similarly, video player 103b is in electrical communication with system control boards 101b and 101c. Finally, video player 103c is in electrical communication with system control boards 101c and 101a. During normal operations, each video player 103 would drive only a single display at a time. However, when the system control board 101 detects a failure in any one of the video players 103, the corresponding redundant video player 103 could be used to drive the display that in communication with the failed video player. For example, if system control board 101b detects a failure in video player 103b, the failed video player may be turned off (or perhaps rebooted) while video player 103a takes over communication with system control board 101b.

Generally speaking, the video data for displaying on display 10 is transmitted from video player 103a and this data can comprise the background image 120, which can be an image that is contained completely within display 10 or can be blended between two or more displays (as shown, blended between display 10 and display 20). In this exemplary embodiment, a point of sale (POS) data output 70 provides information from the establishment's POS system to indicate if an order has been placed, and the information regarding items ordered and the amount owed. Each application may want different types of order confirmation data shown and provided in different types of illustrations, but generally the confirmation would include any one of the following types of information: types of items ordered, quantities, of items ordered, sub-total, taxes owed, and total amount owed.

The system control board 101a may receive the order confirmation data from the POS data output 70 through either a wired or wireless connection. The system control board 101a may then direct the video player 103a to perform any number of image blending techniques in order to incorporate the order confirmation data into the background image data. Exemplary image blending techniques include alpha compositing or alpha blending. In some embodiments, the order confirmation image 200 is provided as transparent or semi-transparent over the background image 120. In other embodiments, the order confirmation image 200 is opaque and is simply shown in front of the background image 120.

Figure 2:
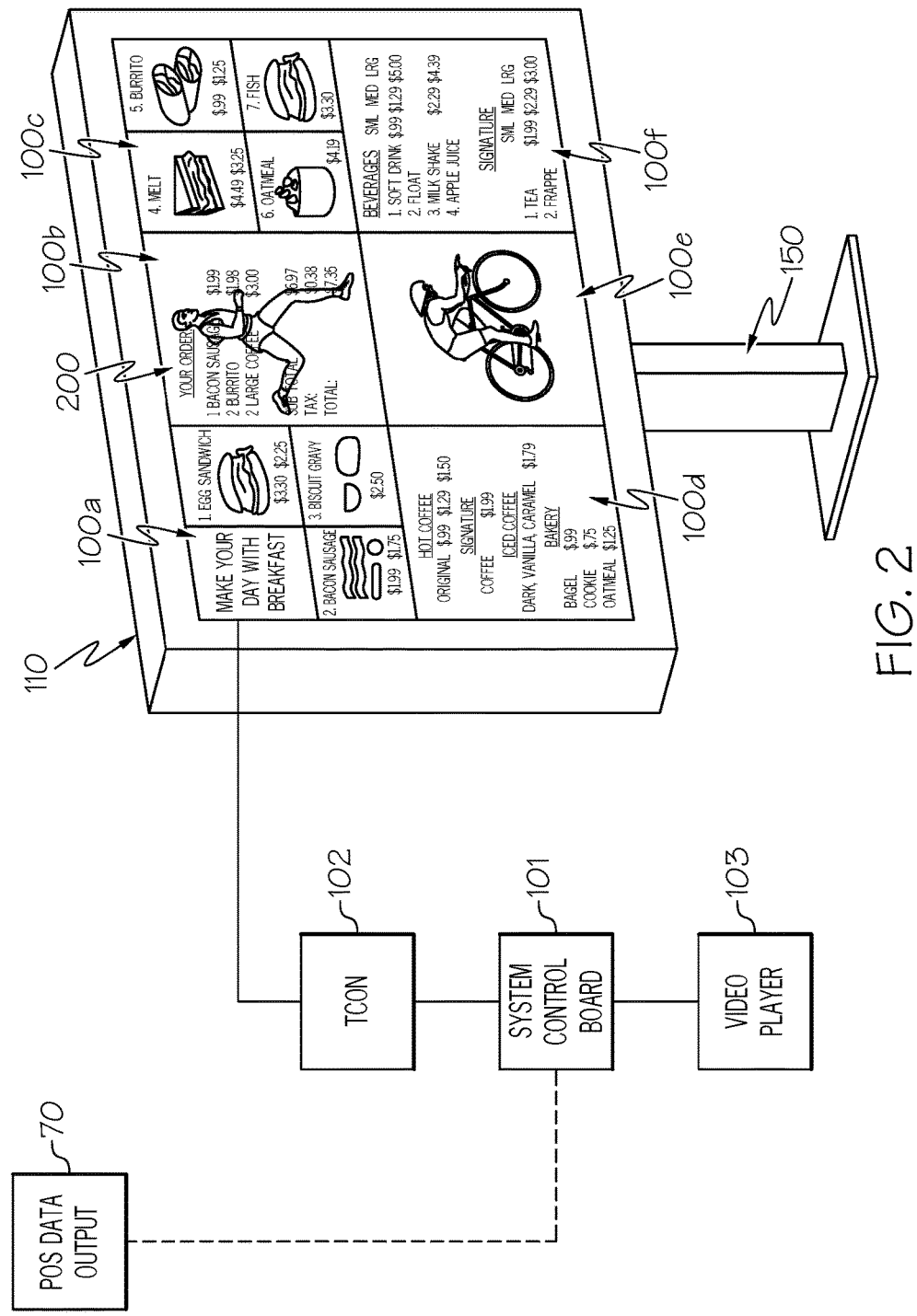
FIG. 2 is a simplified block diagram of a second embodiment of the image blending system.

FIG. 2 is a simplified block diagram of a second embodiment of the image blending system. Here, a single monolithic display 110 is contained within a housing. The assembly lacks the bezels which would need to be placed between each display. The display 110 can be driven in separately controllable areas 100a-100f, where in this case each area is being driven to show a different image. This assembly only requires a single video player and TCON 102 in order to generate these different images within the areas 100a-100f. The display 110 is also preferably mounted on a pedestal 150 which attaches to the housing of the display 110.

This embodiment uses the POS data output 70, video player 103, system control board 101, and TCON 102 in a similar manner to what is described above. In this embodiment however, the order confirmation image 200 is blended by the video player 103 with a background advertising image within one or more of the separately controllable subsection 100b of the display 110.

Figure 3:
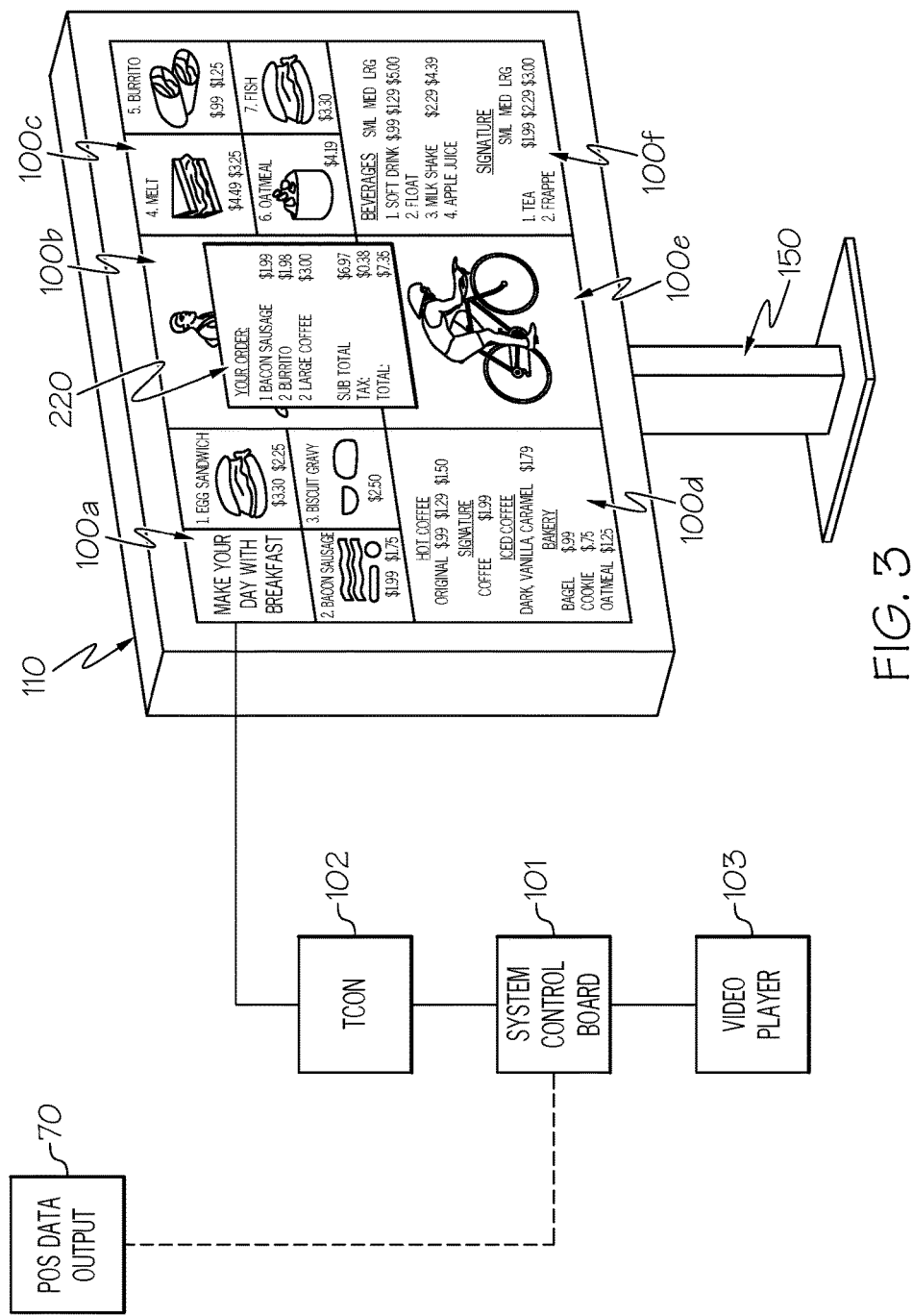
FIG. 3 is a simplified block diagram of a third embodiment of the image blending system.

FIG. 3 is a simplified block diagram of a third embodiment of the image blending system. This embodiment also uses the POS data output 70, video player 103, system control board 101, and TCON 102 in a similar manner to what is described above. In this embodiment however, the order confirmation image 220 is blended completely in front of the background advertising images within any one or more of separately controllable subsections 100a-100f of the display 110. Here, the order confirmation image 220 is contained within a separate window that appears preferably only when an order confirmation is made.

Figure 4:
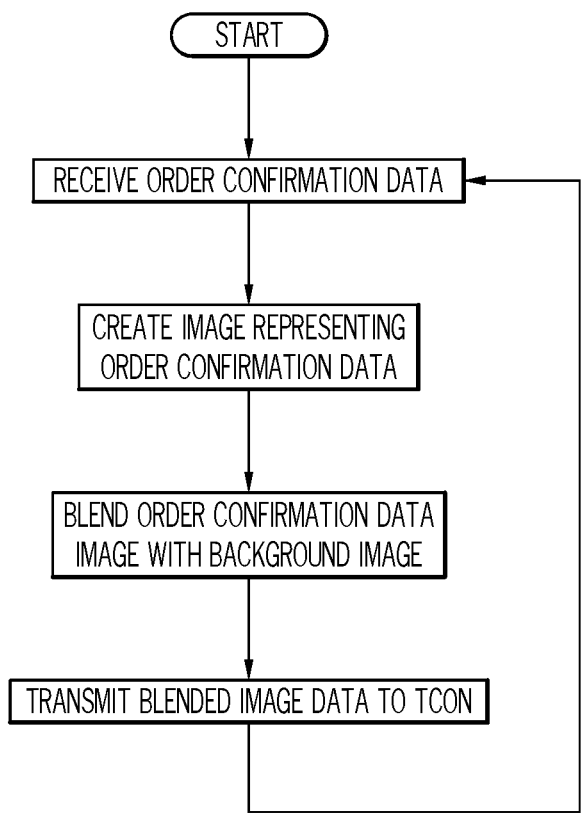
FIG. 4 is a logical flowchart for an exemplary embodiment for operating the processor of the system.

FIG. 4 is a logical flowchart for an exemplary embodiment for operating the processor 60 of the system. Initially, the processor 60 should receive the order confirmation data from the POS data output 70. The processor 60 should then preferably create an image that represents the received order confirmation data. Next, an exemplary processor 60 should direct the video player 103 to blend the order confirmation image with the background image. Finally, the processor should also direct the video player 103 to transmit the blended image data to the TCON 102 for eventual transmission to the display.

The electronic display 110 can be any flat panel electronic display including but not limited to: liquid crystal displays (LCD), organic light emitting diode (OLED) displays, plasma displays, and electroluminescent polymer displays.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A redundant multi-panel display system comprising:
a first electronic display;
a first system control board electrically connected to the first electronic display;
a first video player electrically connected to the first system control board;
a second electronic display;
a second system control board electrically connected to the second electronic display and the first video player;
a second video player electrically connected to the second system control board; and
a point of sale data output configured to receive order information and transmit it to at least one of the first system control board and the second system control board;
wherein the second system control board is configured to begin utilizing the first video player upon failure of the second video player;
wherein the first and second video players are configured to blend the background images with the order information and transmit the blended images to the respective electronic display for display on the respective electronic display.

2. The system of claim 1 further comprising:
a first timing and control board electrically connected to the first system control board and the first electronic display; and
a second timing and control board electrically connected to the second system control board and the second electronic display.

3. The system of claim 2 wherein:
the first and second video players are configured to blend the order information with the background images through an alpha compositing or an alpha blending process.

4. The system of claim 3 wherein:
the alpha value is between 0 and 1.

5. The system of claim 2 wherein:
the order information is blended completely in front of the background image data.

6. The system of claim 1 wherein:
the first and second video players are configured to blend the order information with the background images such that the order information is visible atop of the background images and the background images are at least partially obscured by the order confirmation data.

7. The system of claim 1 wherein:
the blended image is displayed entirely in one of the first and second electronic displays.

8. The system of claim 1 wherein:
the order information is displayed in a separate window.

9. The system of claim 8 wherein:
the separate window appears temporarily after the order information is received.

10. The system of claim 1 wherein:
the background images comprise advertisements.

11. The system of claim 1 wherein:
the order information comprises the names of each of the items ordered.

12. The system of claim 11 wherein:
the order information further comprises the quantity of each of the items ordered, the price of each of the items ordered, and a total amount due.

13. The system of claim 12 wherein:
the order information further comprises a subtotal and a tax amount due.

14. The system of claim 1 further comprising:
a third electronic display;
a third system control board electrically connected to the third electronic display and the second video player;
a third timing and control board electrically connected to the third system control board and the third electronic display; and
a third video player electrically connected to the third system control board and the first system control board;
wherein the third system control board is configured to begin utilizing the second video player upon failure of the third video player; and
wherein the first system control board is configured to begin utilizing the third video player upon failure of the first video player.

15. The system of claim 14 wherein:
said first, second, and third electronic displays are located within a single housing.

16. The system of claim 15 wherein:
said first, second, and third electronic displays are separated from one another by a bezel.

17. A redundant multi-panel display system comprising:
a first electronic display;
a second electronic display;
a third electronic display;
a first system control board electrically connected to the first electronic display;
a first video player electrically connected to the first system control board;
a second system control board electrically connected to the second electronic display and the first video player;
a second video player electrically connected to the second system control board;
a third system control board electrically connected to the third electronic display and the second video player;
a third video player electrically connected to the third system control board and the first system control board; and
a point of sale data output configured to receive order information and transmit the order information to at least one of the first system control board and the second system control board;
wherein the first system control board is configured to begin utilizing the third video player upon failure of the first video player, the second system control board is configured to begin utilizing the first video player upon failure of the second video player, and the third system control board is configured to begin utilizing the second video player upon failure of the third video player.

18. The system of claim 17 wherein:
said first, second, and third electronic displays are located within a single housing and are separated from one another by a bezel.

19. The system of claim 17 wherein:
the first and second video players are configured to blend background images with order confirmation data and to display the blended image on the respective electronic display.

20. A method for providing redundant multi-panel display system comprising:
providing a first, second, and third electronic display, a first system control board electrically connected to the first electronic display, a first video player electrically connected to the first system control board, a second system control board electrically connected to the second electronic display and the first video player, a second video player electrically connected to the second system control board, a third system control board electrically connected to the third electronic display and the second video player, a third video player in electrical connection with the third system control board and the first system control board, and a point of sale data output;
transmitting the order information from the point of sale data output to the first system control board and the second system control board;
blending the order information with background image data at the respective video player for display on the respective electronic display;
operating the first electronic display with the first video player;
operating the second electronic display with the second video player;
operating the third electronic display with the third video player;
upon failure of the first video player, operating the first electronic display utilizing the third video player;
upon failure of the second video player, operating the second electronic display utilizing the first video player; and
upon failure of the third video player, operating the third electronic display utilizing the second video player.

* * * * *